United States Patent [19]
Kikinis

[11] Patent Number: 6,137,591
[45] Date of Patent: Oct. 24, 2000

[54] INTEGRATED COMPUTER AND IMAGE REPRODUCTION SYSTEM

[75] Inventor: Dan Kikinis, Saratoga, Calif.

[73] Assignee: Elonex PLC, London, United Kingdom

[21] Appl. No.: 09/057,014

[22] Filed: Apr. 7, 1998

Related U.S. Application Data

[60] Division of application No. 08/511,749, Aug. 7, 1995, Pat. No. 5,752,075, which is a continuation-in-part of application No. 08/016,122, Feb. 10, 1993, Pat. No. 5,457,785.

[51] Int. Cl.[7] ................................................. G06K 15/00
[52] U.S. Cl. ............................................... 358/1.6; 358/1.1
[58] Field of Search .......................... 358/1.1, 1.8, 1.13, 358/1.6, 1.7, 474, 475, 480, 481, 486; 347/129, 130, 134, 135, 138, 166, 224, 275, 230, 231, 257, 256

[56] References Cited

U.S. PATENT DOCUMENTS 4,424,524  1/1984  Daniele ................................... 346/160
5,270,779  12/1993  Kawai ..................................... 355/313

*Primary Examiner*—Art Evans
*Attorney, Agent, or Firm*—Doanld R. Boys; Central Coast Patent Agency

[57] ABSTRACT

An integrated computer, scanner, and printer has elements of all three in a single enclosure with a single CPU performing all of the control tasks for the three, usually separate, devices. The three functions also share memory space, and control circuitry for the scanning and printing operations are interfaced directly to the system bus of the computer. Control routines in a preferred embodiment are integrated into a single system BIOS. In embodiments of the invention, a light source, such as a laser source, used for electrostatically writing images on a drum for printing, is diverted and also used for scanning operations. In another alternative embodiment, a device-driver-software transparent extended enhanced parallel port is provided for expansion of the bus into an external copy of the internal bus, such that expansion ports may be transparently provided in an external docking box.

5 Claims, 18 Drawing Sheets

| Bit | Host IRQ # Enabled |
|---|---|
| 0 | |
| 1 | |
| 2 | |
| 3 | |
| 4 | |
| 5 | |
| 6 | |
| 7 | |
| 8 | IRQ 5 |
| 9 | IRQ 6 |
| 10 | IRQ 7 |
| 11 | IRQ 15 |
| 12 | 1 = Clock On;  0 = Clock Off |
| 13 | (Future use to enable IRQ4) |
| 14 | |
| 15 | |

Fig. 10

| PIN # | SPP Signal | EPP Signal | $E^2P^2$ Signal | Type | $E^2P^2$ Description |
|---|---|---|---|---|---|
| 1 | STROBE/ | WRITE/ | STROBE/ | O | Negative going half of differential bus strobe pair |
| 2-9 | D(7:0) | AD(7:0) | AD(7:0) | I/O | Address/Data/Status. Bidirectional, byte wide |
| 10 | ACK/ | INTR | INTR | I | Interrupt. Driven active asynchronously by slave on status change |
| 11 | BUSY | WAIT/ | IOICHRDY | I/O | Buffered X-IOCHRDY. Driven active asynchronously by X-ISA device to extend cycle. |
| 12<br>13<br>14<br>15 | PE<br>SELECT<br>AUTOFD/<br>ERROR/ | USER0<br>USER1<br>DATASTB/<br>USER2 | CY0<br>CY1<br>CY2<br>CY4 | O<br>O<br>O<br>O | Cycle type. Encoded signals from the MASTER select the slave operation which will be executed on the next strobe. |
| 16 | INIT/ | USER3 | STROBE | O | Positive going half of differential bus strobe pair, AD and CY are clocked by this signal. |
| 18-19 | GND | GND | PWR | P | Bidirectional power pins. Host can supply or receive power over these lines. |
| 20-25 | GND | GND | GND | P | Ground |

Fig.11

| Pin | Signal | I/O TYPE | Input | Output | Tri-State | Pull Up |
|---|---|---|---|---|---|---|
| 1 | IOW/ | O | | OB16/4 | | |
| 2 | DACK2/ | O | | OB16/4 | | |
| 3 | TC | O | | OB16/4 | | |
| 4 | RSTDRV | O | | OB16/4 | | |
| 5 | STB | I | IST | | | |
| 6 | GND | ND | | | | |
| 7 | DRQ2 | I | uIST | | | IPU1 |
| 8 | IRQ15 | I | uIST | | | IPU1 |
| 9 | IRQ7 | I | uIST | | | IPU1 |
| 10 | IRQ3 | I | uIST | | | IPU1 |
| 11 | IRQ6 | I | uIST | | | IPU1 |
| 12 | VCC | PWR | | | | |
| 13 | IRQ5 | I | uIST | | | IPU1 |
| 14 | IOCHRDY | I | uIST | | | |
| 15 | GND | GND | | | | IPU1 |
| 16 | N/C | | | | | |
| 17 | SD0 | I/O | uIST | | OS16/4 | |
| 18 | SD1 | I/O | uIST | | OS16/4 | |
| 19 | SD2 | I/O | uIST | | OS16/4 | |
| 20 | SD3 | I/O | uIST | | OS16/4 | |
| 21 | GND | GND | | | | |
| 22 | SD4 | I/O | uIST | | OS16/4 | |
| 23 | SD5 | I/O | uIST | | OS16/4 | |
| 24 | SD6 | I/O | uIST | | OS16/4 | |
| 25 | SD7 | I/O | uIST | | OS16/4 | |
| 26 | GND | GND | | | | |
| 27 | SD8 | I/O | uIST | | OS16/4 | |
| 28 | SD9 | I/O | uIST | | OS16/4 | |
| 29 | SD10 | I/O | uIST | | OS16/4 | |
| 30 | SD11 | I/O | uIST | | OS16/4 | |
| 31 | GND | GND | | | | |
| 32 | SD12 | I/O | uIST | | OS16/4 | |
| 33 | SD13 | I/O | uIST | | OS16/4 | |
| 34 | SD14 | I/O | uIST | | OS16/4 | |
| 35 | SD15 | I/O | uIST | | OS16/4 | |
| 36 | VCC | PWR | | | | |
| 37 | GND | GND | | | | |
| 38 | PWRON_RST | I | uIST | | | IPU1 |
| 39 | N/C | | | | | |
| 40 | GND | GND | | | | |

Fig. 12

| DEVICE | ISA I/O ADDRESS | $E^2P^2$ ADDRESS | DATA WIDTH |
| --- | --- | --- | --- |
| NET0 | 300-31F | 00-1F | Configurable |
| OPT0 | 220-227 | 20-27 | Configurable |
| OPT1 | 228-22F | 28-2F | Configurable |
| NET1 | 340-35F | 40-5F | Configurable |
| SHD | 170 | 60 | 16 Bit |
| SHD | 171-177 | 61-67 | 8 Bit |
| SFDC/SHD | 370-377 | 70-77 | 8 Bit |
| LPT1/EPP | 378-37F | 78-7F | 8 Bit |
| PFDC/PHD | 3F0-3F7 | F0-F7 | 8 Bit |

Fig. 13

| Pin | Signal | I/O TYPE | Input | Output | Tri-State | Pull Up |
|---|---|---|---|---|---|---|
| 1 | IOW/ | I | ILST | | | |
| 2 | DACK2/ | I | I | | IST | |
| 3 | TC | I | IST | | | |
| 4 | RESET | I | IST | | | |
| 5 | CLK | I | ILST | | | |
| 6 | GND | GND | | | | |
| 7 | DRQ2 | O | | | OS16/4 | |
| 8 | IRQ15 | O | | | OS16/4 | |
| 9 | IRQ7 | O | | | OS16/4 | |
| 10 | IRQ3 | O | | | OS16/4 | |
| 11 | IRQ6 | O | | | OS16/4 | |
| 12 | VCC | PWR | | | | |
| 13 | IRQ5 | O | | | OS16/4 | |
| 14 | IOCHRDY | O | | | | OS16/4 |
| 15 | GND | GND | | | | |
| 16 | IOCS16/ | O | | | | OS16/4 |
| 17 | SD0 | I/O | IST | | OS16/4 | |
| 18 | SD1 | I/O | IST | | OS16/4 | |
| 19 | SD2 | I/O | IST | | OS16/4 | |
| 20 | SD3 | I/O | IST | | OS16/4 | |
| 21 | GND | GND | | | | |
| 22 | SD4 | I/O | IST | | OS16/4 | |
| 23 | SD5 | I/O | IST | | OS16/4 | |
| 24 | SD6 | I/O | IST | | OS16/4 | |
| 25 | SD7 | I/O | IST | | OS16/4 | |
| 26 | GND | GND | | | | |
| 27 | SD8 | I/O | IST | | OS16/4 | |
| 28 | SD9 | I/O | IST | | OS16/4 | |
| 29 | SD10 | I/O | IST | | OS16/4 | |
| 30 | SD11 | I/O | IST | | OS16/4 | |
| 31 | GND | GND | | | | |
| 32 | SD12 | I/O | IST | | OS16/4 | |
| 33 | SD13 | I/O | IST | | OS16/4 | |
| 34 | SD14 | I/O | IST | | OS16/4 | |
| 35 | SD15 | I/O | IST | | OS16/4 | |
| 36 | VCC | PWR | | | | |
| 37 | GND | GND | | | | |
| 38 | PS3 | I/O | ILST | | OS24 | |
| 39 | PS2 | I/O | ILST | | OS24 | |
| 40 | GND | GND | | | | |

Fig. 14

| Pin | Signal | I/O TYPE | Input | Output | Tri-State | Pull Up |
|---|---|---|---|---|---|---|
| 41 | GND |  | ILST |  |  |  |
| 42 | n/c | I | ILST | IST |  | IPU1 |
| 43 | PS1 | I | ILST |  |  | IPD1 |
| 44 | PS0 | I/O |  |  | OS24/12 |  |
| 45 | AD7 | PWR |  |  |  |  |
| 46 | VCC | GND | ILST |  |  |  |
| 47 | GND | I/O | ILST |  | OS24/12 |  |
| 48 | AD6 | I/O |  |  | OS24/12 |  |
| 49 | AD5 | GND | ILST |  |  |  |
| 50 | GND | I/O | ILST |  | OS24/12 |  |
| 51 | AD4 | I/O |  |  | OS24/12 |  |
| 52 | AD3 | GND |  |  |  |  |
| 53 | GND | O | IST |  | OS24/12 |  |
| 54 | PC3 | I/O |  |  | OS24/12 |  |
| 55 | AD2 | PWR |  |  |  |  |
| 56 | VCC | GND |  |  |  |  |
| 57 | GND | O | IST |  | OS24/12 |  |
| 58 | PC2 | I/O |  |  | OS24/12 |  |
| 59 | AD1 | GND | IST |  |  |  |
| 60 | GND | I/O | IST |  | OS24/12 |  |
| 61 | PS4 | I/O |  |  | OS24/12 |  |
| 62 | AD0 | GND |  |  |  |  |
| 63 | GND'PC1 | O |  |  | OS24/12 |  |
| 64 | PC0 | O |  |  | OS24/12 |  |
| 65 | GND | GND | IST |  |  |  |
| 66 | SA0 | I | IST |  |  |  |
| 67 | SA1 | I | IST |  |  |  |
| 68 | SA2 | I | IST |  |  |  |
| 69 | SA3 | I | IST |  |  |  |
| 70 | SA4 | I | IST |  |  |  |
| 71 | SA5 | I |  |  |  |  |
| 72 | VCC | PWR | IST |  |  |  |
| 73 | SA6 | I |  |  |  |  |
| 74 | GND | GND | IST |  |  |  |
| 75 | SA7 | I | IST |  |  |  |
| 76 | SA8 | I | IST |  |  |  |
| 77 | SA9 | I | IST |  |  |  |
| 78 | AEN | I | IST |  |  |  |
| 79 | CS/ | I | IST |  |  |  |
| 80 | IOR/ | I |  |  |  |  |

Fig. 15

| Pin | Signal | I/O TYPE | Input | Output | Tri-State | Pull Up |
|---|---|---|---|---|---|---|
| 1 | IOW/ | O | | OB16/4 | | |
| 2 | DACK2/ | O | | OB16/4 | | |
| 3 | TC | O | | OB16/4 | | |
| 4 | RSTDRV | O | | OB16/4 | | |
| 5 | STB | I | IST | | | |
| 6 | GND | ND | | | | |
| 7 | DRQ2 | I | uIST | | | IPU1 |
| 8 | IRQ15 | I | uIST | | | IPU1 |
| 9 | IRQ7 | I | uIST | | | IPU1 |
| 10 | IRQ3 | I | uIST | | | IPU1 |
| 11 | IRQ6 | I | uIST | | | IPU1 |
| 12 | VCC | PWR | | | | |
| 13 | IRQ5 | I | uIST | | | IPU1 |
| 14 | IOCHRDY | I | uIST | | | |
| 15 | GND | GND | | | | IPU1 |
| 16 | N/C | | | | | |
| 17 | SD0 | I/O | uIST | | OS16/4 | |
| 18 | SD1 | I/O | uIST | | OS16/4 | |
| 19 | SD2 | I/O | uIST | | OS16/4 | |
| 20 | SD3 | I/O | uIST | | OS16/4 | |
| 21 | GND | GND | | | | |
| 22 | SD4 | I/O | uIST | | OS16/4 | |
| 23 | SD5 | I/O | uIST | | OS16/4 | |
| 24 | SD6 | I/O | uIST | | OS16/4 | |
| 25 | SD7 | I/O | uIST | | OS16/4 | |
| 26 | GND | GND | | | | |
| 27 | SD8 | I/O | uIST | | OS16/4 | |
| 28 | SD9 | I/O | uIST | | OS16/4 | |
| 29 | SD10 | I/O | uIST | | OS16/4 | |
| 30 | SD11 | I/O | uIST | | OS16/4 | |
| 31 | GND | GND | | | | |
| 32 | SD12 | I/O | uIST | | OS16/4 | |
| 33 | SD13 | I/O | uIST | | OS16/4 | |
| 34 | SD14 | I/O | uIST | | OS16/4 | |
| 35 | SD15 | I/O | uIST | | OS16/4 | |
| 36 | VCC | PWR | | | | |
| 37 | GND | GND | | | | |
| 38 | PWRON_RST | I | uIST | | | IPU1 |
| 39 | N/C | | | | | |
| 40 | GND | GND | | | | |

Fig. 16

| Pin | Signal | I/O TYPE | Input | Output | Tri-State | Pull Up |
|---|---|---|---|---|---|---|
| 41 | N/C | | | | | |
| 42 | PS1 | O | | OB24/12 | | |
| 43 | PS0 | O | | OB24/12 | | |
| 44 | AD7 | I/O | uIST | | OS24/12 | |
| 45 | VCC | PWR | | | | |
| 46 | GND | GND | | | | |
| 47 | AD6 | I/O | uIST | | OS24/12 | |
| 48 | AD5 | I/O | uIST | | OS24/12 | |
| 49 | GND | GND | | | | |
| 50 | AD4 | I/O | uIST | | OS24/12 | |
| 51 | AD3 | I/O | uIST | | OS24/12 | |
| 52 | GND | GND | | | | |
| 53 | PC3 | I | uIST | | | |
| 54 | AD2 | I/O | uIST | | OS24/12 | |
| 55 | VCC | PWR | | | | |
| 56 | GND | GND | | | | |
| 57 | PC2 | I | uIST | | | |
| 58 | AD1 | I/O | uIST | | OS24/12 | |
| 59 | GND | GND | | | | |
| 60 | PS4 | I | uIST | | | |
| 61 | AD0 | I/O | uIST | | OS24/12 | |
| 62 | GND | GND | | | | |
| 63 | PC1 | I | uIST | | | |
| 64 | PC0 | I | uIST | | | |
| 65 | GND | GND | | | | |
| 66 | SA0 | O | | OB16/4 | | |
| 67 | SA1 | O | | OB16/4 | | |
| 68 | SA2 | O | | OB16/4 | | |
| 69 | SA3 | O | | OB16/4 | | |
| 70 | SA4 | O | | OB16/4 | | |
| 71 | SA5 | O | | OB16/4 | | |
| 72 | VCC | PWR | | | | |
| 73 | SA6 | O | | OB16/4 | | |
| 74 | GND | GND | | | | |
| 75 | SA7 | O | | OB16/4 | | |
| 76 | SA8 | O | | OB16/4 | | |
| 77 | SA9 | O | | OB16/4 | | |
| 78 | AEN | O | | OB16/4 | | |
| 79 | N/C | | | | | |
| 80 | IOR/ | O | | OB16/4 | | |

Fig. 17

INTEGRATED COMPUTER AND IMAGE REPRODUCTION SYSTEM

CROSS-REFERENCE TO RELATED DOCUMENTS

The present application is a divisional patent application Ser. No. 08/511,749 filed Aug. 7, 1995 now U.S. Pat. No. 5,752,075 which is a continuation in-part of Ser. No. 08/016,122 filed Feb. 10, 1993 now U.S. Pat. No. 5,457,785 incorporated herein in its entirety by reference.

FIELD OF THE INVENTION

The present invention is in the area of personal computer (PC) and image reproduction devices, and pertains more particularly to integration of such devices into a single apparatus.

BACKGROUND OF THE INVENTION

A typical personal desktop computer and peripherals configuration may comprise a computer, an electrostatic printer, and a scanner. The electrostatic printer may be a laser printer or a light-emitting diode type, or any type of electrostatic printer where a light energy is used to write image data to be transferred to a print medium, such as paper. In current art these devices are provided in separate enclosures, and are typically connected by communication links, such as serial or parallel ports. They do, however, have some common subsystems and elements. For example, each such device has its own processor or CPU to manage operations, its own random access memory (RAM), and its own power supply subsystem. An Electrostatic printer and a scanner each have their own separate image reproduction subsystems as well. Since each of these devices uses some of the same type subsystems, having separate subsystems for each is a significant redundancy. This redundancy causes unnecessary cost and excessive use of office space.

What is clearly needed is a system that integrates a computer, a scanner, and an electrostatic printer into one device in one enclosure, allowing the different devices to share common elements components. A computer, a scanner, and an electrostatic printer, in such a device according to an embodiment of the present invention, would share the same memory, processor, and power supply subsystems, at a minimum, and eliminate communication interfaces between the conventional systems. The scanner and electrostatic printer would share the same image reproduction components, for example. Integrating a computer, a scanner, and an electrostatic printer into a single enclosure, and having them share common components as described above and in more detail below, would significantly decrease cost to producers, distributors, retailers, and consumers.

SUMMARY OF THE INVENTION

In a preferred embodiment of the present invention an image-enhanced computer system is provided comprising a system enclosure; an electrostatic printer portion within the system enclosure including a light source, an organic photoconducting cartridge (OPC), a document handling system, and a fuser; a scanning system within the system enclosure including a light-intensity detector and a scanning support surface for a scanned document; and a computer portion within the system enclosure, the computer portion comprising a CPU, a system memory, a video adapter circuit coupled to an output port for a video monitor, a keyboard controller coupled to a keyboard port, a scanner drive and interface circuit, a printer drive and interface circuit, control routines executable by the CPU for operating the computer portion, the scanning system and the electrostatic printer, and a communication bus connecting the CPU, the video adapter, the keyboard controller, the scanner drive and interface circuit, the printer drive and interface circuit, and the system memory. The electrostatic printer portion, the scanning system and the computer portion all share the system memory, and the CPU controls the scanning system and the electrostatic printer through the scanner drive and interface circuit and the printer drive and interface circuit.

In an embodiment the scanner system and the electrostatic printer share a common light source, light from the light source being deflected to the OPC or the scanning support surface by deflection apparatus under control of the CPU. In one embodiment the light source is a laser source, and in another it is an LED light bar. In the LED embodiment, the LED light bar is rotated under computer control to face away from the OPC and into the deflection apparatus. Light from the common light source follows a light path during scanning operations, and a semi-opaque mirror in the light path deflects a portion of light in the light path into the light-intensity detector.

In various embodiments, scanning may be from a flat surface with no translation of a document being scanned, in which case the light is scanned from one end of the document to the other, or the scanner portion of the apparatus may have a document feed, whereby a document to be scanned may be translated past a scanning position.

In some embodiments the computer portion further comprises a pointer port, a floppy disk controller (FDC), a serial port, a parallel printer port, and an integrated device electronics (IDE) controller. Control routines may be a part of a basic input output system (BIOS) coupled to the system bus or a part of a software operating system.

In one embodiment a special enhanced parallel port is provided having a master controller connected to the system bus and to a byte-wide intermediate bus, a slave controller connected to the byte-wide intermediate bus and to a an external parallel bus of the same width as the system bus. The master controller translates system bus signals onto the byte-wide intermediate bus and the slave controller retranslates the signals on the intermediate bus back into system bus signals on the external parallel bus, all transparent to software executable by the image-enhanced computer system.

A printer-scanner apparatus is also provided which may be connected to a host computer for performing both printing a scanning operations.

Integrating a computer, a scanner, and an electrostatic printer into a single enclosure has an advantage of using less desk-top or table-top space than the current method, and also of sharing control circuitry and memory space, thereby saving cost. These advantages make the personal desktop computer desktop and peripherals configuration, described for the present invention, available and more usable to a larger number of consumers than having a computer, scanner, and electrostatic scanner in separate cases.

BRIEF DESCRIPTION OF THE DRAWINGS

FIG. 10 is a table of bit assignments for the Interrupt Enable Register for the PIO port of FIG. 7.

FIG. 11 is a table of cable pin and register bit assignments for each of 3 operating modes for the PIO port of FIG. 7.

FIG. 12 is a table of state descriptions for the PIO port of FIG. 7.

FIG. 13 is a table of internal to external device I/O address translations and data sizes.

FIG. 14 is a pinout listing for pins 1–40 of a master state-translation and control device according to the invention.

FIG. 15 is a pinout listing of pins 41–80 for the master device of FIG. 14.

FIG. 16 is a pinout listing for pins 1–40 of a slave state-translation device according to the invention.

FIG. 17 is a pinout listing for pins 41–80 of the slave device of FIG. 16.

DESCRIPTION OF PREFERRED EMBODIMENTS

Figure 1:
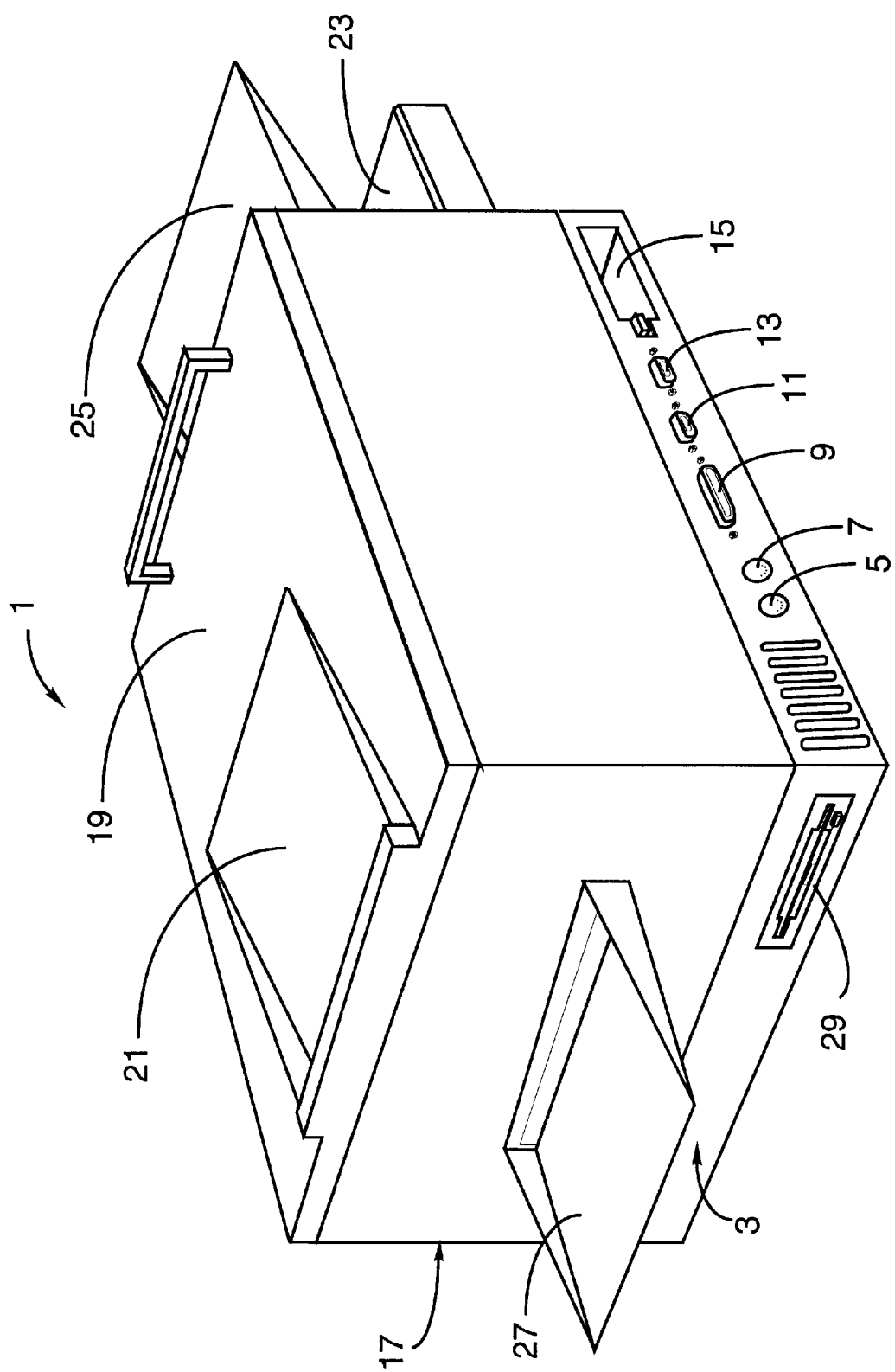
FIG. 1 is an isometric view of an integrated computer/scanner/printer according to an embodiment of the present invention.

In the present invention, an integrated system is provided having a computer, an electrostatic printer, and a scanner integrated into a single device in a single enclosure. This system in various embodiments is referred to herein as an Image Enhanced Computer (IEC) system. FIG. 1 is an isometric view of an IEC system 1 according to a preferred embodiment of the present invention.

IEC system 1 comprises a computer section 3 and an image reproduction section 17, described more fully below. Computer section 3 includes typical elements of a personal computer, such as a desk-top computer, including a central processing unit (CPU), a random access memory (RAM), a communication bus, and the like, described more fully below.

Image reproduction section 17 includes typical elements of a scanner and an electrostatic printer, including a light source, a light detector, an organic photoconducting cartridge (OPC), a toner, input output paper path mechanisms, and the like, described more fully below.

Computer section 3 also includes, but is not limited to, typical interfaces such as a pointer device port 5, a keyboard port 7, a parallel port 9, a serial port 11, a video port 13, a Personal Computer Memory Card International Association (PCMCIA) slot 15, and a three and one-half inch floppy disk drive 29. In alternative embodiments, computer section 3 may have an AT-bus or a PCI-bus docking device for expansion boards, and an additional parallel port with proprietary circuitry for an Extended Enhanced Parallel Port as disclosed in U.S. application Ser. No. 08/016,122, of which the present application is a continuation-in-part.

Image reproduction section 17 in a preferred embodiment includes, but is not limited to, typical medium mechanisms as known in art, such as a scanner cover 19, a scanner automatic document feeder (ADF) tray 21, a scanner original/printer paper output tray 25, and a print medium input tray 23. In an alternative embodiment, image reproduction section 17 includes an alternate scanner document/printer paper output tray 27 on the opposite side of the enclosure from scanner original/print paper output tray 25, to allow heavy or fragile print media to travel in a straight line through image reproduction section 17 without damage.

Figure 2A:
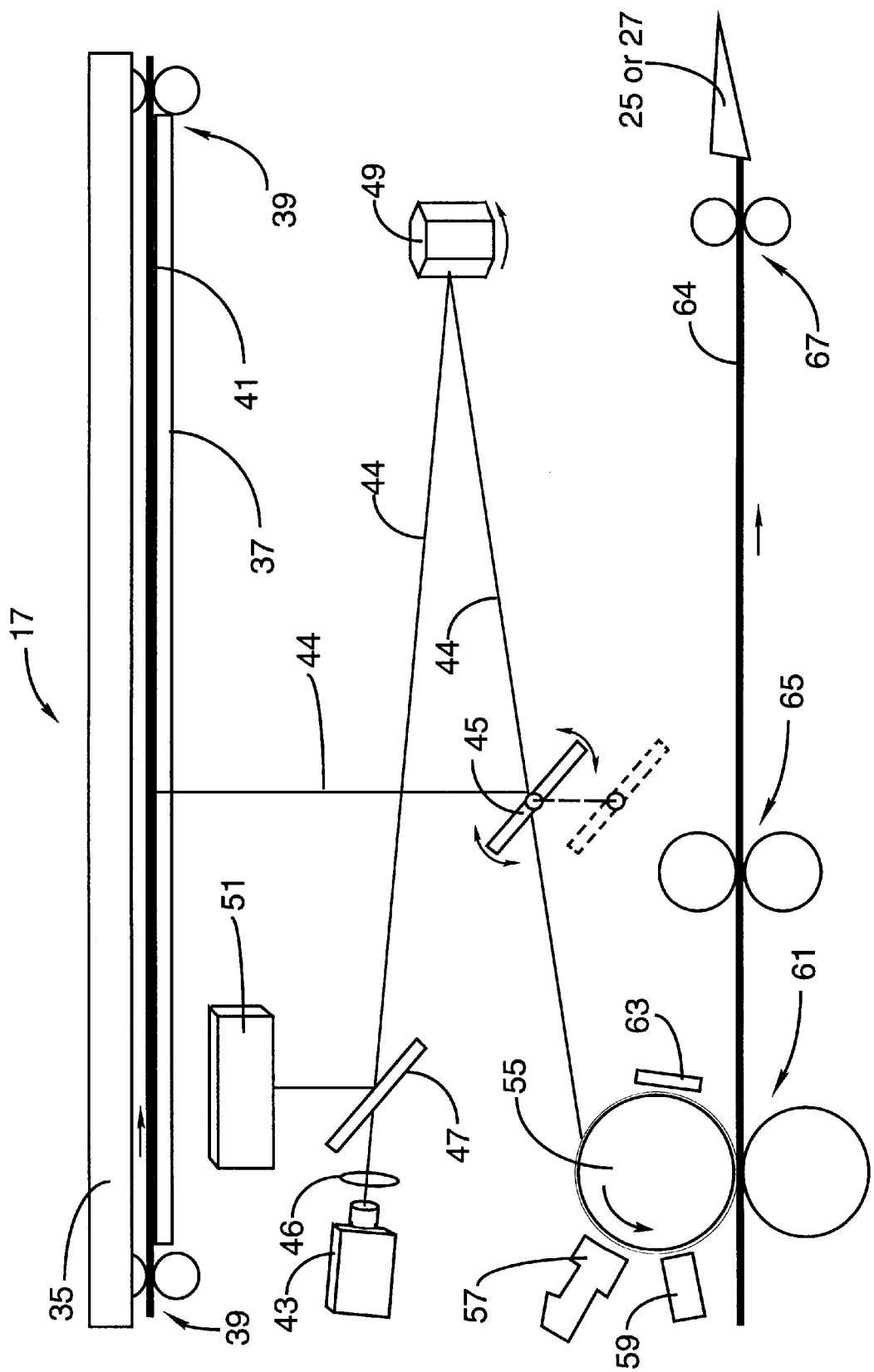
FIG. 2A is a mostly schematic and representative elevation view of internal components and connectivity for the integrated device of FIG. 2.

FIG. 2A is a mostly schematic diagram of internal elements of image reproduction section 17, according to a preferred embodiment of the present invention, incorporating a laser light source for scanning and printing. Section 17 in this embodiment comprises integrated scanner and electrostatic printer mechanisms, more fully described below.

Printer operation in the this embodiment utilizes light from a laser light source 43. Light is modulated according to digital printing signals from computer section 3, is focused through focusing lens 46, passing through semi-opaque mirror 47 to multi-faceted rotating mirror 49. Multi-faceted rotating mirror 49 reflects light with a scanning motion past mirror 45, which is retracted to the position shown by dotted lines from light path 44 during printing operation, to strike OPC 55. Light striking OPC 55 creates an electrostatic image corresponding to signals from computer 3 to laser light source 43. As the surface of OPC 55 passes toner cartridge 57, toner is electrostatically attracted to OPC 55.

OPC 55 passes the toner-bearing electrostatic image through an image transfer process at position 61, and an image fixing process at position 65 to a print medium, such as paper or the like, traveling along a path 64 and moved by rollers 67. The image is fixed by heat to the paper print media with fixing rollers at point 65. This station is called a fuser in the art. Printed media is then deposited into output tray 25 or alternate output tray 27. OPC 55 passes toner removal apparatus 59 and electrostatic removal apparatus 63 in preparation for new electrostatic imaging. The laser writing on the drum, the toner application, the transfer to the print medium, the fixing of the toner by heat, the toner removal for the drum, and the electrostatic removal (erasing), are all conventional apparatus and processes in Laser printing as known in the art.

In the embodiment of FIG. 2A, the IEC system includes a lid 35 to cover a hard-copy document 41 while the document is being scanned, and to protect the operator from light following light path 44, more fully described below. The IEC system also comprises a glass plate 37 to hold document 41 in place while rollers 39 move document 41 across glass plate 37 during a scanning operation.

The scanning process also uses light from laser source 43. In this case the light is typically modulated at a constant frequency. Light traveling along light path 44 is focused through focusing lens 46, then passes through semi-opaque mirror 47 to multi-faceted rotating mirror 49. Multi-faceted rotating mirror 49 reflects the light to mirror 45, which in turn reflects the light through glass plate 37 to document 41 to be scanned. With each light pulse, light is reflected back along light path 44 to mirror 45, to multi-faceted rotating mirror 49 and back to semi-opaque mirror 47. The light intensity in light path 44 depends, to some extent, on the presence or absence of black, white, or any gray-scale at the illuminated points on document 41. Semi-opaque mirror 47 reflects a portion of the light in the light path to light-sensitive detector 51, which converts light intensity to digital signals that can be used by computer section 3.

For sheet-fed scanning operations, where document 41 moves across glass plate 37 driven by rollers 39, mirror 45 remains in the position shown by the solid lines in FIG. 2A. For flat-bed scanning operations, where document 41 is held stationary on glass plate 37, mirror 45 rotates on its axis to move the horizontal light scans light from one end of the document to the other. The flat-bed scanner implementation does not require document feeding, but does require that mirror 45 be tilted.

Figure 2B:
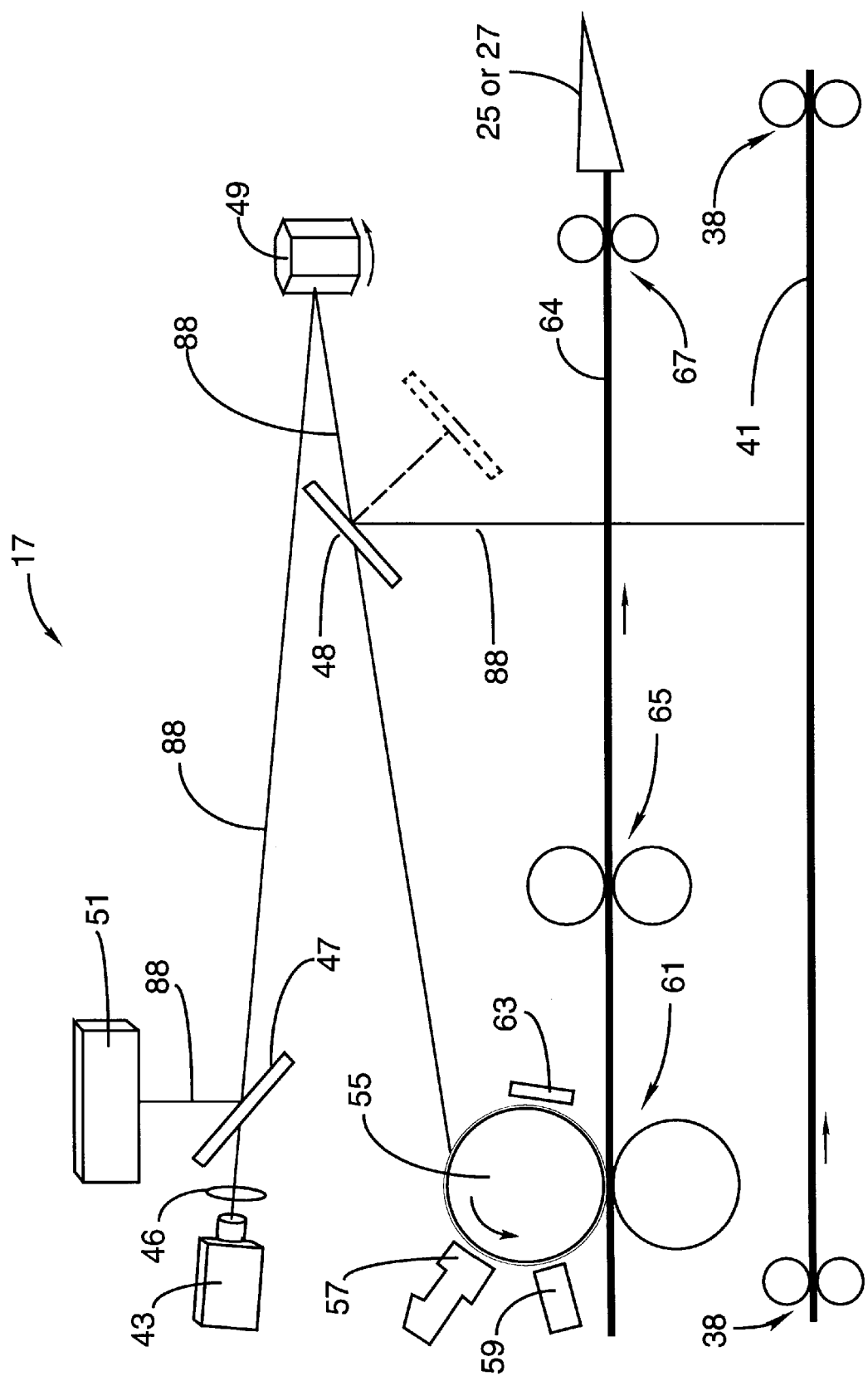
FIG. 2B is a mostly schematic and representative elevation view of internal components and connectivity for an integrated device in an alternative embodiment of the present invention.

FIG. 2B is a mostly schematic diagram of an image reproduction section 17 according to an alternative embodiment of the present invention, incorporating a sheet-fed document path for scanning located at the bottom of image reproduction section 17. In the alternative embodiment of FIG. 2B, the scanner mechanism moves document 41 across light path 88 by rollers 38 during scanning operation. The scanning process is essentially the same as described above for the embodiment of FIG. 2A wherein the document is fed.

The scanning process for the embodiment of FIG. 2B uses light from source 43, modulated at a constant frequency. Light traveling along light path 88 is focused through focusing lens 46, then passes through a semi-opaque mirror 47 to a multi-faceted rotating mirror 49. Multi-faceted rotating mirror 49 reflects the light to mirror 48, which reflects the light to document 41. With each light pulse, light is reflected back to mirror 48, which reflects the light to multi-faceted rotating mirror 49 and back to semi-opaque mirror 47. Semi-opaque mirror 47, reflects a portion of the light to light-sensitive detector 51. Light sensitive detector 51 converts the light intensity to digital signals that can be used by computer section 3. For scanning, mirror 48 is moved into light path 88 from the position shown in FIG. 2B by dotted lines. For printing, mirror 48 occupies the position shown by dotted lines.

Figure 3:
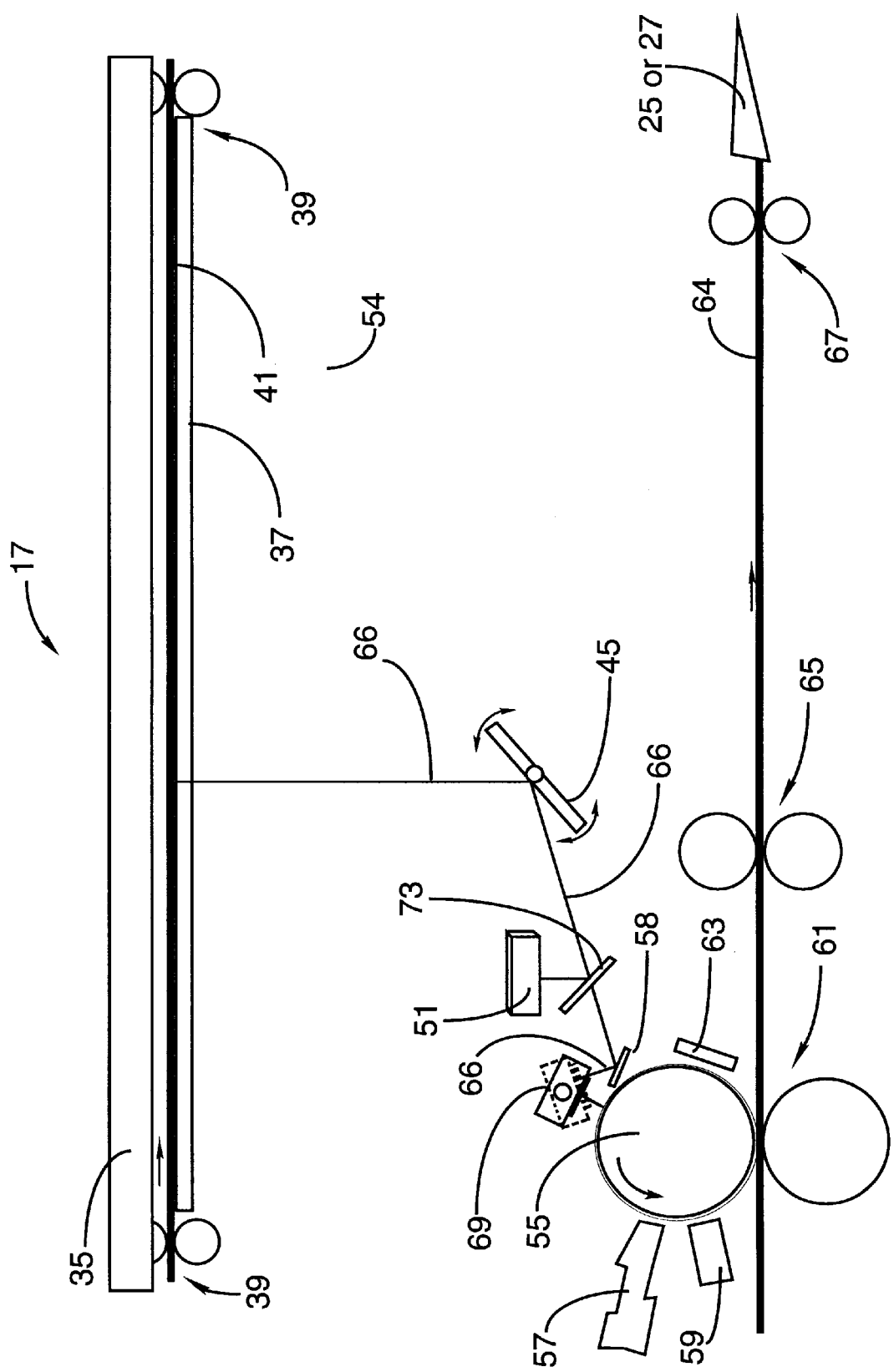
FIG. 3 is a mostly schematic and representative elevation view of internal components and connectivity for an integrated device according to yet another alternative embodiment of the present invention.

In the embodiment of FIG. 2B, printer operation is the same as described for FIG. 2A. FIG. 3 is a mostly schematic diagram of an image reproduction section 17, according to an alternative embodiment of the present invention, which uses a light emitting diode (LED) bar, well known in the art, as a light source for scanning and printing, rather than a laser light source. An LED bar is an array of light emitting diodes (LED) which run the width of OPC 55. In the embodiment of FIG. 3 the LED bar is mounted on a pivoting mechanism, wherein the bar may rotated around a horizontal axis to serve as a light source for scanning.

For printing, light from LED bar 69 is modulated according to digital printing signals from computer section 3, and strikes OPC 55, writing an electrostatic image on the drum as described above for a laser light source. Light striking OPC 55 creates an electrostatic image corresponding to signals from computer section 3 to LED bar light source 69. The image develops according to the LED bar light source 69 scan relative to rotating motion of OPC 55. As the surface of OPC 55 passes toner cartridge 57, toner is electrostatically attracted to OPC 55. OPC 55 passes the toner-impregnated electrostatic image to a print medium such as paper at point 61, and fixes the toner image to the print medium at point 65. The paper or other medium travels along a path 64 moved by rollers 67. Printed media is then deposited into output tray 25 or alternate output tray 27.

OPC 55 passes a toner removal apparatus 59 and electrostatic erasing apparats 63 in preparation for new electrostatic imaging for another page to printed.

In this alternative embodiment, the scanner mechanism includes many of the elements of the scanner mechanism described above relative to FIG. 2A, such as lid 35 to cover the document 41 while it is being scanned, and to protect the operator from light following light path 66, more fully described below. The scanner mechanism also comprises a glass plate 37 to support hold document 41 while rollers 39 move document 41 across glass plate 37 during scanning operations. A scanning process comprises LED bar 69 rotating to face mirror 58. Light reflects from mirror 58, passes through semi-opaque mirror 73, reflects from mirror 45 and through glass plate 37 to document 41. As LED bar 69 scans, light is reflected back along light path 66. The light intensity in light path 66 depends, to some extent, on the presence or absence of black, white, or gray-scale at the illuminated point on document 41.

Semi-opaque mirror 73 reflects a portion of light in the light path to light-sensitive detector 51, which converts intensity data to digital signals that can be used by computer section 3.

For sheet-fed scanning operations, where document 41 moves across glass plate 37, mirror 45 remains fixed. For flat-bed scanning operations, where document 41 is held stationary on glass plate 37, mirror 45 rotates on its axis to move the light scans from one end of the document to the other.

Figure 4:
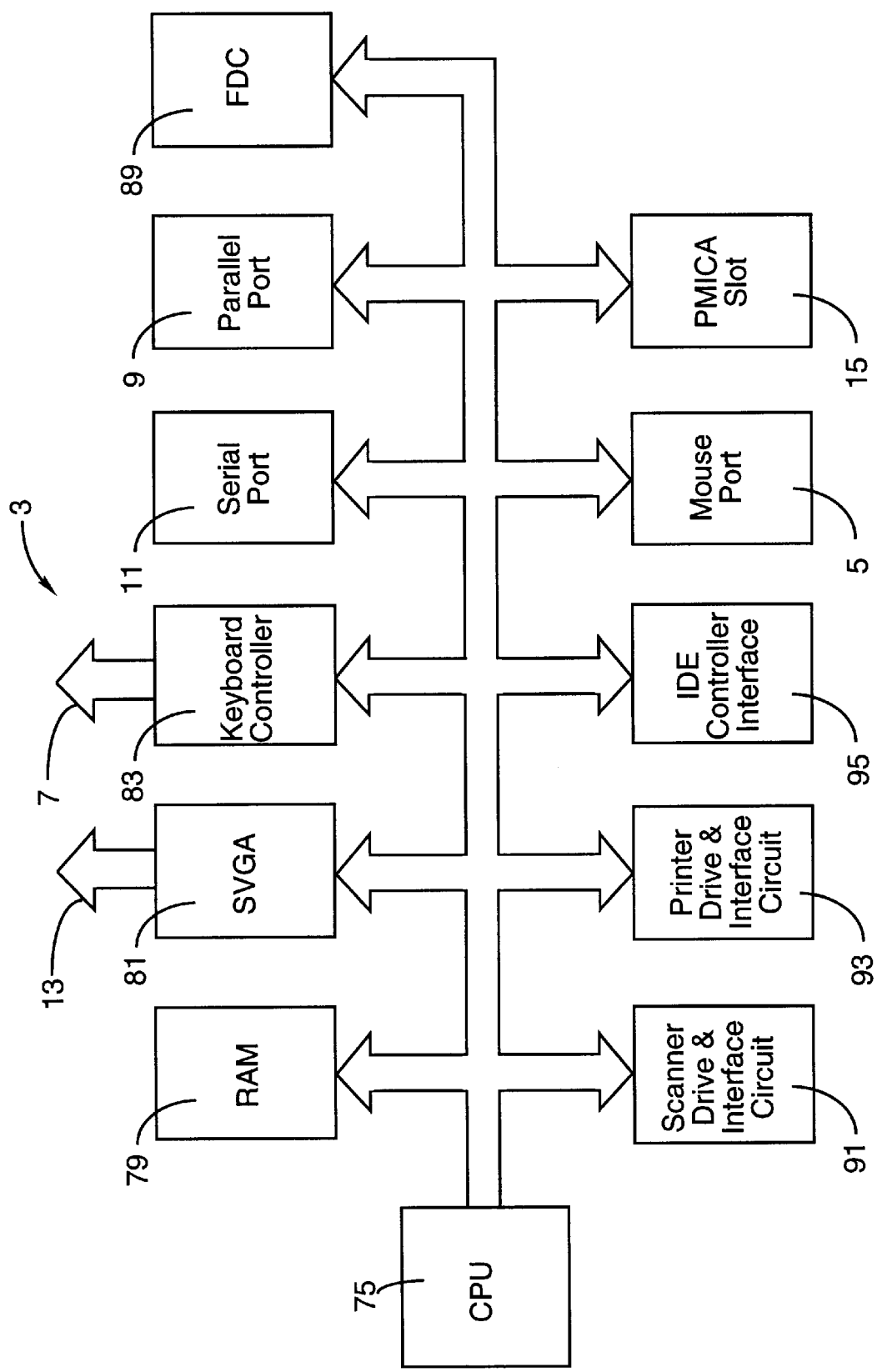
FIG. 4 is a block diagram of control elements and communication for an integrated device according to an embodiment of the present invention.

FIG. 4 is a diagram of a communication bus 101 in computer section 3, and various controllers and electronic interfaces connected to the bus. Bus 101 may be a standard computer bus, such as an IBM-compatible AT or EISA bus, or any of a number of other well-known bus apparatus. Bus 101 connects a central processing unit (CPU) 75 to a variety of circuits for data communication.

Bus 101, according to a preferred embodiment of the present invention, provides parallel data communication with circuits that are typical and well-known in current PC art, such as a random access memory (RAM) 79, a super video-graphics array (SVGA) display adapter 81, a keyboard controller 83, a serial port 11, a parallel port 9, a floppy disk controller (FDC) 89, an integrated electronics disk (IDE) controller 95, a mouse port 5, and a personal computer memory card international association (PCMCIA) slot 15, and the like. In embodiments of the present invention, communication bus 101 also connects to includes a scanner drive controller and interface circuit 91 and a printer drive controller and interface circuit 93.

Scanner drive and interface circuit 91 provides drive and interface signals to and from CPU 75 to image reproduction section 17 during scanner operations. Such scanner drive and interface signals include, but are not limited to, signals to control laser light source 43 or alternative embodiment LED bar light source 69, document drive control signals, multi-faceted rotating mirror 49 rotation speed and on-off commands, receiving output from detector 51, rotating mirror 45 for flat-bed scanning, and the like. Printer drive and interface circuit 93 provides typical drive and interface signals to and from CPU 75 during printer operations. Printer drive and interface signals include, but are not limited, laser light source 43 or alternative embodiment LED bar light source 69 control, retraction of mirror 45, multi-faceted rotating mirror 49 rotation speed and on-off commands, OPC 55 speed and on-off commands, image fixing process 65 on-off, electrostatic surfacing process 63 on-off, and the like.

By interfacing controls for the scanning operations and printing operations directly to bus 101, and by using RAM 79 for scanning and printing operations, duplicate CPU and memory elements are eliminated. Also, in a preferred embodiment of the invention, control routines for scanning and printing are incorporated in a basic input/output system (BIOS) for the IEC system of the invention, and menu-based interactive interfaces are provided on a connected video display by CPU 75 through SVGA adapter 79.

IEC System With an Extended Enhanced Parallel Port

In the embodiments described above, there has been no provision for expansion ports to bus 101, wherein peripheral devices, such as modems and the like, may be added. Expansion ports as are well-known in the art are provided in some embodiments of the present invention within the common enclosure of the IEC system, but these embodiments have a disadvantage of requiring more volume in the case, and access to the expansion connectors. In an alternative embodiment, an extended enhanced parallel port is provided in place of, or in addition to, parallel port 9 shown in FIG. 4.

An extended enhanced parallel port(E2P2) is described below in detail, which provides for operating external peripheral devices, and for providing external copies of the internal bus in a manner that is device-driver-software transparent. This disclosure material is drawn from parent patent application Ser. No. 08/016,122, which has been incorporated by reference, and is intended herein to provide a substitute port or an additional port to those shown above for the IEC system of the invention, enabling transparent expansion.

General Description of $E^2P^2$ Port

The present invention, called Extended Enhanced Parallel Port ($E^2P^2$) by the inventors, is an expansion bus interface for small computer systems. $E^2P^2$ comprises master circuitry in the host computer for interfacing to the host computer I/O bus, slave circuitry for interfacing to an external ISA expansion bus (X-ISA) and a multiplexed $E^2P^2$ bus between the two, multiplexing data, address and status information over a byte-wide pathway. Both the master and the slave circuitry interface to the $E^2P^2$ bus as well.

In some cases the X-ISA bus amounts to a single ISA compatible device connected to the slave circuitry. For example, $E^2P^2$ permits attachment of standard ISA bus I/O port devices to a host computer via a cable connection to the parallel port connector. $E^2P^2$ buffering and control circuit devices multiplex required I/O address, data and control signals over a byte-wide cable interface independently of host computer device control program steps. The cable interface, which is the $E^2P^2$ bus, is preferably a Centronics-type printer cable. $E^2P^2$ is also compatible with device control program steps and external devices intended to operate according to SPP and EPP standards.

$E^2P^2$ supports the following subset of ISA bus signals over the multiplexed intermediate bus, and synthesizes them in the external X-ISA bus:

| SD[0 ... 15] | DACK2/ | SA[0 ... 9] | TC |
|---|---|---|---|
| IOCS16/ | IRQ[5 ... 7] | IOCHRDY | IRQ15 |
| IOR/ | RESET | IOW/ | BCLK |
| AEN | OSC | DRQ2 | ALE |

$E^2P^2$ and a Single Peripheral Device

Figure 5:
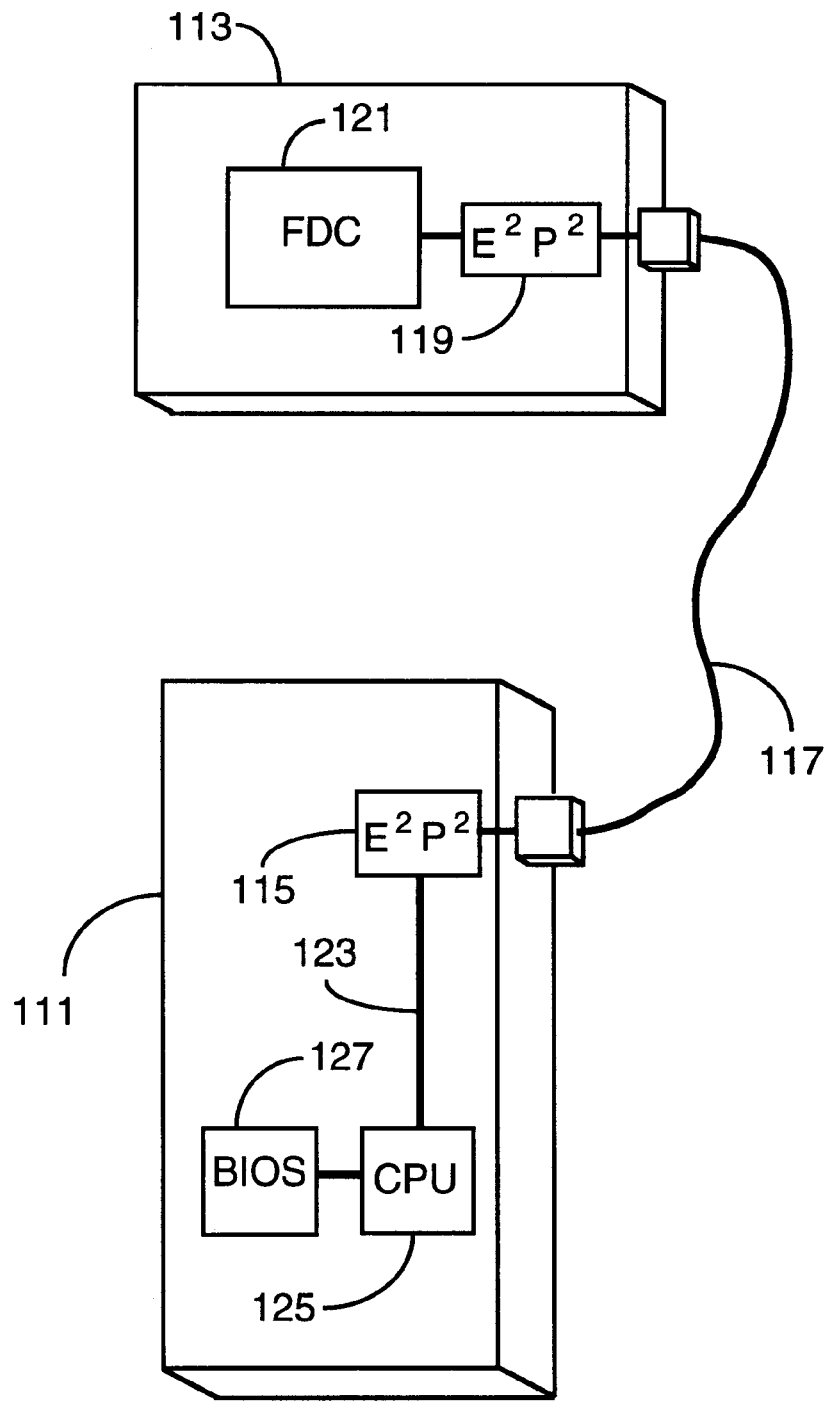
FIG. 5 is a largely schematic representation of a computer with an external disk storage device connected through a PIO port and signal cable according to the present invention.

FIG. 5 shows an embodiment of the present invention for a computer 111 and an external floppy disk drive 113. An $E^2P^2$ host port 115, comprising master circuitry according to the invention, multiplexes and demultiplexes I/O address, data and control signals transmitted over a cable 117 having 25-pin connectors and 25 conductors plus a shield, to slave circuitry 119 of the $E^2P^2$ system. There is also provision in a preferred embodiment for transmitting power over the cable. The slave circuitry interfaces the cable bus back to ISA standard bus protocol. In a preferred embodiment the master portion of the $E^2P^2$ system is rendered as a first application specific integrated circuit (ASIC) and the slave portion is rendered as a second ASIC.

Slave circuitry 119 comprises two state machines. One of these realizes a subset of an ISA bus state machine. The other translates between ISA bus states and $E^2P^2$ bus states. $E^2P^2$ host port 115 has multiple operating modes, which are described below. A floppy disk controller 121 interacts with the X-ISA bus state machine exactly as though it were connected to a host computer ISA bus, such as bus 123. The $E^2P^2$ extended expansion system, once configured, is completely transparent to standard AT device driver software for a list of supported devices (see FIG. 13).

A physical embodiment of an X-ISA bus is optional in an embodiment such as FIG. 5. The physical implementation of the bus is generally not required where one device, such as the floppy disk device shown, is tethered to the host port. CPU 125 executes floppy disk control program steps in a BIOS 127 and interacts with the floppy disk exactly as it would if floppy disk controller 121 were physically connected to the host computer ISA bus 123. It will be apparent to one with skill in the art that other peripheral devices such as a hard disk drive or network adapter might replace the floppy disk drive and controller in alternative embodiments of a single device connected to the host port.

In $E^2P^2$ an external peripheral device according to the invention that lack a power supply can draw current at +5 volts to power the device from $E^2P^2$ host port 115 via a conductor in cable 117. Details of this power circuitry are described below.

$E^2P^2$ With a Docking Box

Figure 6:
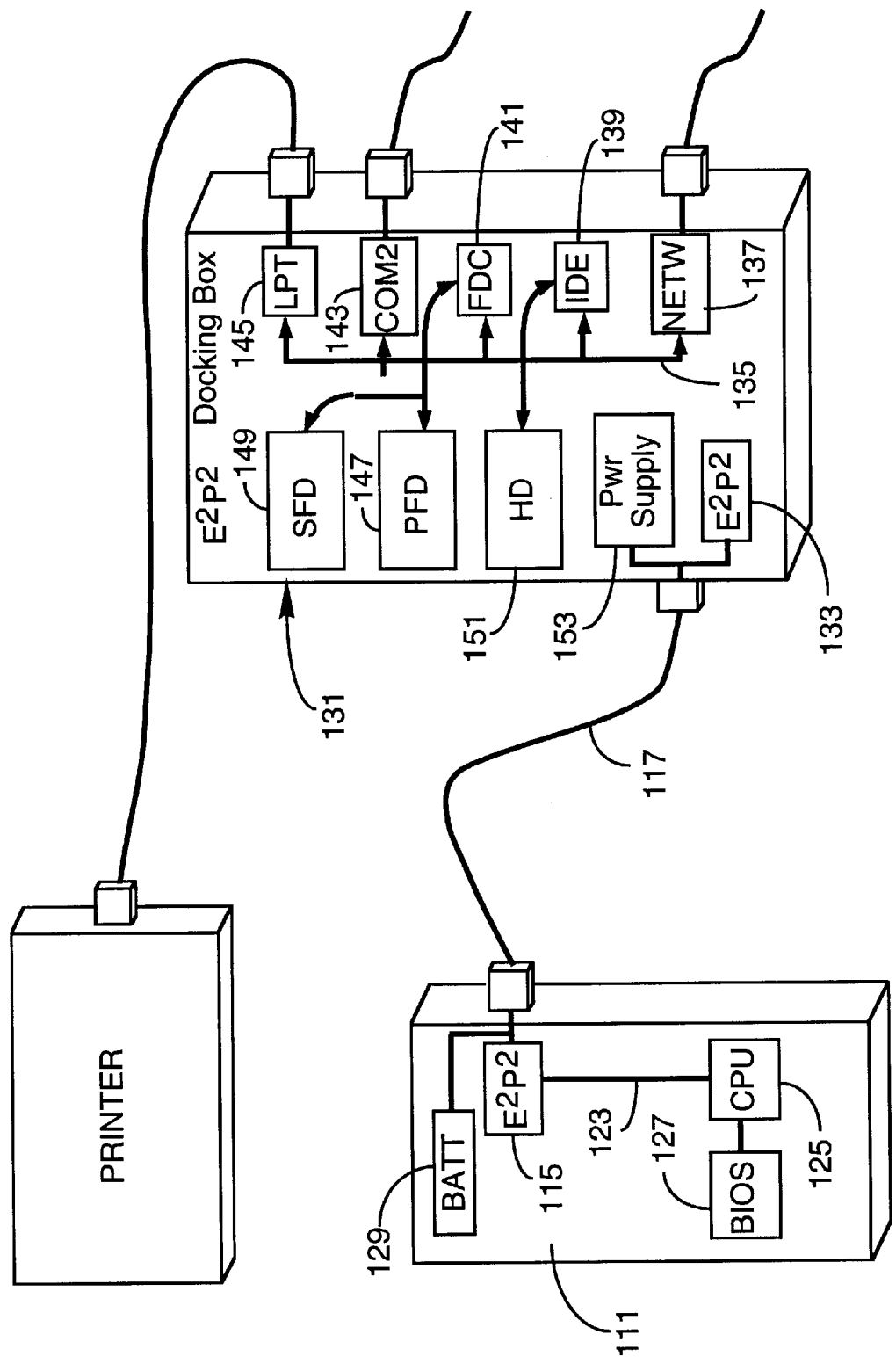
FIG. 6 is a largely schematic representation of a computer connected by a PIO port and a signal cable to a docking box according to the present invention.

FIG. 6 shows another embodiment of the present invention in which cable 117 connects $E^2P^2$ host port 115 of computer 111 to a docking box 131 comprising an X-ISA controller 133, an X-ISA bus 135, a network adapter 137, an integrated device electronics (IDE) interface 139, a floppy disk controller 141, a serial communication port 143, a parallel printer port 145, a primary floppy disk drive 147, a secondary floppy disk drive 149, a secondary hard disk drive 151, and a power supply 153. X-ISA controller 133 provides a bridge between the $E^2P^2$ bus of cable 117 and the X-ISA bus 135. X-ISA bus 135 is a typical ISA bus with multiple plug-in card connectors.

CPU 125 controls the states of the peripheral devices on bus 135 using the same program steps in BIOS 127 that it would use if these devices were attached to ISA bus 123. A battery 129, which supplies power for computer 111 when the computer is disconnected from external power sources, may receive up to 4 amperes of +12 volt charging current from power supply 153 while operating with docking box 131 connected via cable 117.

Figure 7:
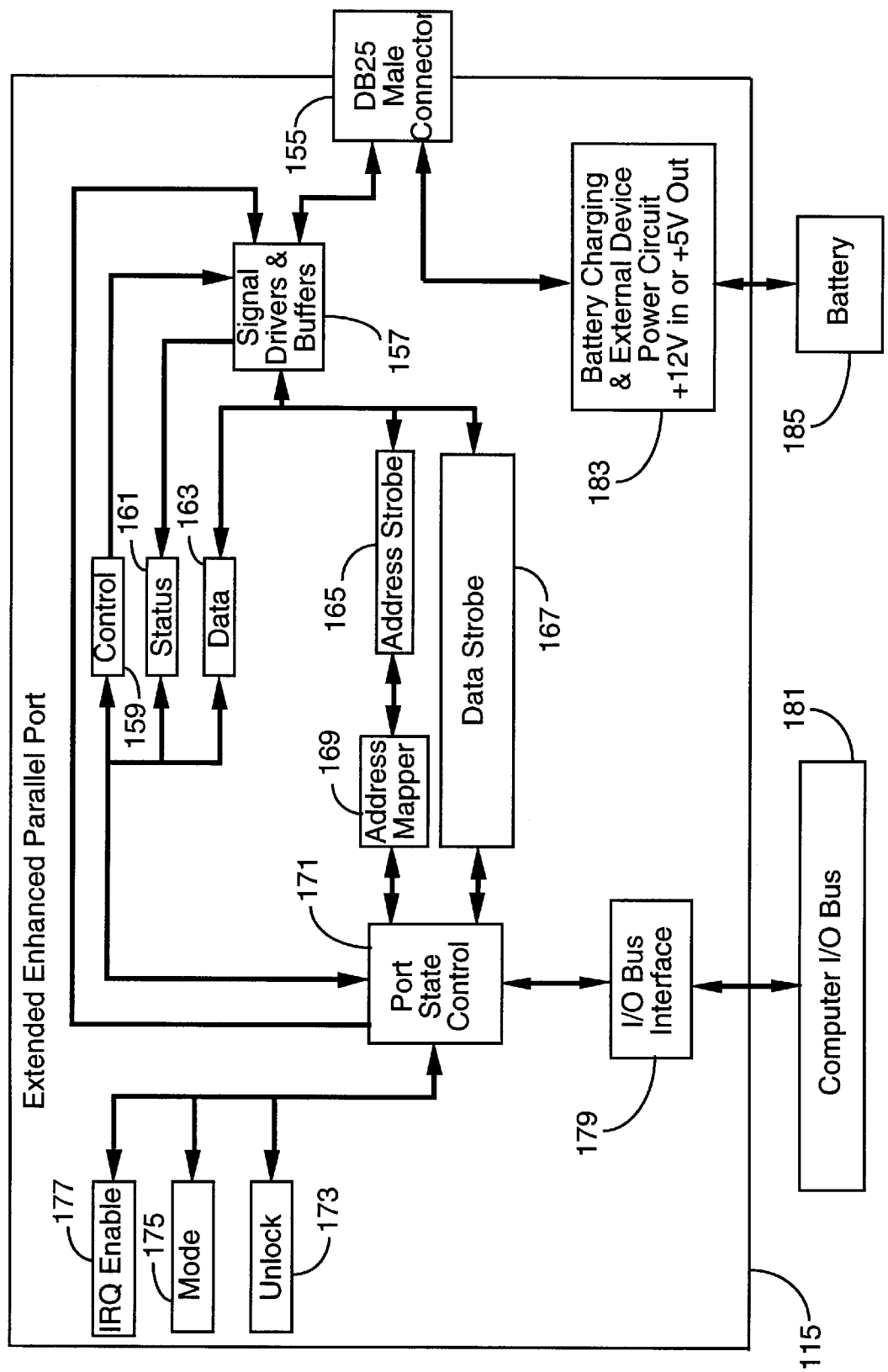
FIG. 7 is a largely schematic representation of a PIO port interface according to the present invention.

FIG. 7 illustrates an embodiment of $E^2P^2$ host port 115 of the present invention; that is, the master portion of the $E^2P^2$. A 25-pin cable connector 155 mates with a complementary connector on cable 117. A set of signal line drivers and buffers 157 interfaces cable 117 to a Control Register 159, a Status Register 161, a Data Register 163, and an Automatic Address Strobe Register 165, all of which are 1-byte (8-bit) registers. A 4-byte Automatic Data Strobe Register 167 is also interfaced to cable 117 by line drivers and buffers 157. The contents of the Automatic Data Strobe Register 167 may be addressed by byte or word. An Address Mapper 169 interfaces the Automatic Address Strobe Register 165 to a State Control and Data Router 171. The State Control and Data Router 171 also interfaces all the other registers listed above plus an Unlock Register 173, a Mode Register 175 and an IRQ Enable Register 177, which are 16-bit port-control registers, to an I/O Bus Interface 179. I/O Bus Interface 179 comprises bus driver and receiver devices for interfacing to a computer I/O bus 181.

Unlock Register 173 controls host write access to the other registers. After hardware reset the other registers are write protected. Writing the data pattern OOA5/h to the Unlock Register enables them. Writing any other value to the Unlock Register will restore write protection.

Figure 9:
FIG. 9 is a table of bit assignments for the Mode Register for the PIO port of FIG. 7.

A table of functions controlled by bits of Mode Register 175 of FIG. 7 is shown in FIG. 9. Bits 0–2 control the operating mode of $E^2P^2$ 115. By using the binary decimal value of bits 0–3 as an indicator, up to eight operating modes are indicated as shown in FIG. 9. For example, if the decimal value of the binary representation of bits 0–3 is 3 (011), then the mode is $E^2P^2$. Bits 3–5 select the data width of network adapter ports zero and one and option port zero. Bits 6 and 7 are reserved. Bits 8–15 control ISA bus to $E^2P^2$ port address mapping and IRQ enables for the ports listed.

FIG. 10 shows a table of ISA bus IRQ levels for use by X-ISA bus port devices. These are controlled by bits 8–11 of IRQ Enable Register 177, with bit 13 reserved for future use for IRQ4. A set bit enables the corresponding IRQ level. Bit 12 is used for Clock Off and Clock On.

Power Transfers

In $E^2P^2$ mode an external port power circuit (XPPC) 183 connects between the +5 volt power supply of computer 111 and pin-18 or 19 of 25-pin cable connecter 155 that is defined as a ground pin for SPP and EPP modes, as shown in FIG. 11. XPPC 183 supplies +5 volt power to unpowered external devices, such as external floppy disk 113. In an embodiment of $E^2P^2$ host port 115 for a battery powered computer, XPPC 183 also allows X-ISA controller 133 to supply up to 4 amperes of +12 volt charging current to battery 85 from a power supply 153 while the $E^2P^2$ external port 133 is activated.

Figure 8:
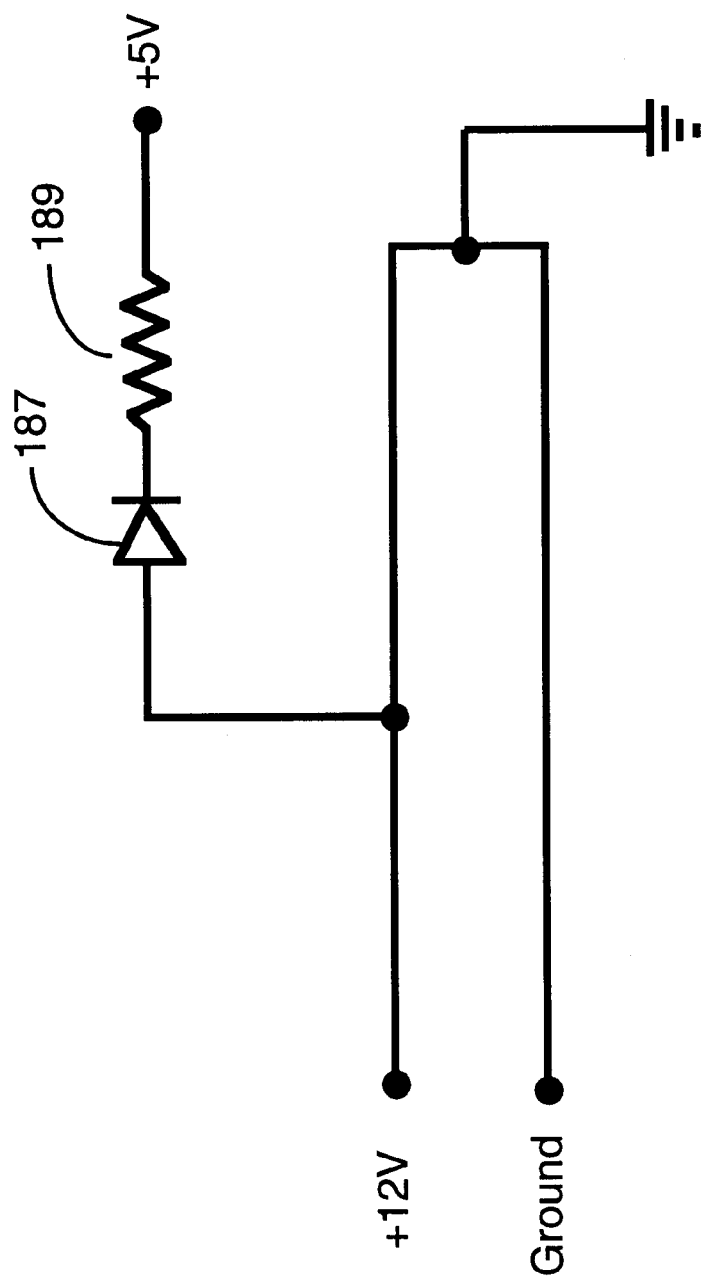
FIG. 8 is a schematic diagram showing a battery charging circuit for the PIO port of FIG. 7.

FIG. 8 shows an embodiment of XPPC 183. A diode 187 allows current to be drawn from the positive pole of +5 volt battery 185 (FIG. 7), thus causing the battery to charge, when +12 volts is applied to pin-18 of cable 155 by power supply 153. Diode 187 prevents a short circuit of battery 185 by attachment of cable 155 to an external device that grounds pin 18 of cable 155. A resistor 189 connected between pin 18 of cable 155 and system ground provides a regulating load to power supply 153.

A table showing the $E^2P^2$ bus cable connector pin to register connections and signal designations for all three modes of operation of $E^2P^2$ is shown in FIG. 1. One with skill in the art will recognize that the signal designations for SPP and EPP modes are compatible with devices built for those modes of operation.

$E^2P^2$ mode uses the data lines on pins 2–9 to multiplex external device address and data as do EPP devices, but also uses them to communicate IRQ state information. $E^2P^2$ mode allows the $E^2P^2$ bus state machine to use control and status lines, pin 1 and pins 10–16, for bus control signals of the $E^2P^2$ bus. Pins 12–15 carry $E^2P^2$ bus cycle (CY) signals. $E^2P^2$ mode switches the pins 1 and 16 line drivers from open ended to differential drive with positive drive voltage on pin 16 and negative drive voltage on pin 1. This differentially driven circuit carries the bus strobe pulse. One with skill in the art will recognize that there improved noise immunity offered by this arrangement. $E^2P^2$ mode also activates connection of XPPC 183 to pin 18 and 19. Pins 20–25 are connected to chassis ground in all three parallel port operating modes.

$E^2P^2$ supports a subset of the ISA peripheral status lines. These are:

| IRQ[5 ... 7] | IRQ15 | DRQ2/DACK2 |
| --- | --- | --- |

These status lines are monitored by the slave portion of the system. Whenever there is a change in status the $E^2P^2$ signal INTR is asserted to the host $E^2P^2$ device. At the completion of the current $E^2P^2$ cycle the host $E^2P^2$ device will perform a status read cycle followed immediately by a write cycle to a Status Image Register in the slave circuitry. When the Status Image Register matches the current state of the X-ISA status lines, the slave de-asserts the INTR signal.

FIG. 12 displays the $E^2P^2$ AD cycles by type and corresponding hex value on the CY lines.

FIG. 13 is a table indicating peripheral I/O devices supported by $E^2P^2$ in the embodiments described herein. I/O device address translation mapping between 10-bit ISA bus values and 8-bit $E^2P^2$ bus values are indicated. Other embodiments might use different mappings for the same I/O devices or map a different set of I/O devices. 16-bit data values are multiplexed through the $E^2P^2$ bus as two consecutive 8-bit values. When a program step causes CPU 125 to address an I/O address in column 2 of the table and the enable bit for that device is set in Mode Register 175, port state controller 171 routes the I/O address bits to address mapper 169, which performs the address translation and loads the 8-bit address value into Address Strobe Register 165.

In FIG. 13 the following abbreviations are used:
NET=Network Device
OPT=Optional Device
SHD=Secondary Hard Disk Controller
SFDC=Secondary Floppy Disk Controller
LPT=Line Printer
PFDC=Primary Floppy Disk Controller
PHD=Primary Hard Disk Controller In operation a computer equipped with $E^2P^2$ employs a start up routine that comprises a "tickle" operation for querying the parallel port(s) to discover the nature of devices connected thereto. Typically the tickle routine is a program step or steps in the computer BIOS for sending a code to one of the pins on the parallel port. The tickle code could be a series of logical high signals in a specified period of time, or some other code.

As an operating example, an $E^2P^2$ computer with an external floppy disk connected to the parallel port would tickle the port (at a specific pin) on start up, and the External floppy would, if equipped for $E^2P^2$, answer on a "handshake" line, whereupon the start up routine would set the operating mode for $E^2P^2$. The tickle routine could similarly discover if the mode should be EPP or SPP.

DMA Prefetch

Memory devices such as disk drives using $E^2P^2$ are always remote, connected either singly over a cable of up to three meters, or in, or tethered to, a docking box communicating through a cable and $E^2P^2$ interfaces. This remote placement, as opposed to local placement for typical conventional systems, poses a memory access problem that is handled through firmware at the $E^2P^2$ host interface circuitry.

Data transfer from a floppy disk device to the host system is exemplary. In a conventional system the floppy controller is installed locally, i.e in the same frame as the host system. For every byte of data to be transferred from the floppy to the host during a floppy read operation, the floppy controller first makes a data request signal (DRQ) to the system's DMA controller. There is no indication from the floppy controller whether this is a request to read data or to write data. The DMA controller is pre-programmed by the system software to respond with either a read or a write acknowledge signal.

In the $E^2P^2$ implementation the floppy controller is remote, communicating over a cable of up to three meters in length. In this case, when the floppy controller makes a data transfer request for a read operation, the $E^2P^2$ host circuitry intercepts the request and gets the data from the floppy controller before passing the request on to the host system. This is necessary because a device making a DMA transfer request to the system is required to have the data ready for writing to system memory at the time of the request. In the case of the remote floppy communicating over the $E^2P^2$ cable some time is required to transfer the data over the cable. So the $E^2P^2$ system is configured to prefetch the floppy data before making the transfer request to the host system.

When $E^2P^2$ sees the initial DRQ signal from the floppy controller it has to have some way of knowing whether the request is to read data or to write data. Only the DMA hardware "knows" for sure, as a result of host system programming. Accordingly, the $E^2P^2$ is configured with "trap" hardware to watch for the specific host system instruction to the DMA that sets it up for servicing floppy read data requests. When this instruction is trapped, then the $E^2P^2$ system knows to respond to the next series of DRQ's as read requests and to prefetch the data from the floppy and present it to the system bus before passing on the DRQ to the system DMA controller. The inventors refer to this capability as a "premonition pipeline".

After intercepting a read setup command for DMA, $E^2P^2$ continues to interpret DRQ's from the floppy as read requests until another command that is not a read setup command to the DMA is intercepted.

Pinouts

In a preferred embodiment, as described above, the $E^2P^2$ master circuitry at the host system end is implemented as an ASIC, and the slave circuitry at the remote end of the $E^2P^2$ bus is implemented as a second ASIC. FIGS. 14 and 15 comprise a pinout listing for the host master ASIC in this embodiment, FIG. 14 listing pins 1–40, and FIG. 15 listing pins 41–80.

Relative to the master chip in this embodiment, when the chip is powered down (VCC=0 volts), all pins that are designated as having OS24/12 or OS24 outputs must be capable of sinking 22 milliamps through their ESD diode to ground. The die must be able to sink this current indefinitely on all OS24/12 and OS24 output pins simultaneously. Additionally, all output drivers have slew rate limiting with a time constant of approximately 4 nanoseconds.

In addition to the above, OS16/4 indicates a tri-state driver that can sink 16 ma and source 4 ma. OS24/12 indicates a tri-state output driver that can sink 24 ma and source 12 ma. Pins PS2 and PS3 must sink and source 24 ma.

FIG. 16 is a pinout listing for pins 1–40 of the slave ASIC, and FIG. 17 is a pinout listing for pins 41–80 of the slave ASIC. Relative to the slave chip in this embodiment, when the chip is powered down (VCC=0 volts), all pins that are designated as having OS24/12 or OS24 outputs must be capable of sinking 22 milliamps through their ESD diode to ground. The die must be able to sink this current indefinitely on all OS24/12 and OS24 output pins simultaneously. Additionally, all output drivers have slew rate limiting with a time constant of approximately 4 nanoseconds.

In addition to the above, OS16/4 indicates a tri-state driver that can sink 16 ma and source 4 ma. OS24/12 indicates a tri-state output driver that can sink 24 ma and source 12 ma. Pins PS2 and PS3 must sink and source 24 ma. Also, OB16/4 indicates an output driver that can sink 16 ma and source 4 ma.

There is one register in the slave chip, the Status Image Register, mentioned briefly above. The data in this register is driven onto the AD[7:] wires when a Read Status Image cycle is performed on the slave. This register can be written via the AD[7:0] wires when a Write Status Image command is sent to the slave from the master. This register is not directly read/writable by the host system.

It will be apparent to those with skill in the art that there are many alterations in detail that might be made without departing from the spirit and scope of the invention. For example, there are a variety of alternatives for apparatus for scanning and for printing to be implemented in a single case. There are similarly a variety of alternatives for interface circuitry and for control routines to integrate the operations of the computer, scanner, and printer. The scope of the invention is limited only by the breadth of the claims.

What is claimed is:

1. A printer-scanner apparatus, comprising:
   an enclosure;
   an electrostatic printer portion within the enclosure including a LED light bar light source, an organic photoconducting cartridge (OPC), a document handling system, and a fuser;
   a scanning system within the enclosure including a light-intensity detector and a scanning support surface for a scanned document; and
   control circuitry including a controller and a memory coupled to the scanning system, the electrostatic printer and to a communication system to a host computer;
   wherein the LED light bar light source is positioned in close proximity to the OPC, and the scanning system and the electrostatic printer share the common light source, light from the light source being deflected to the OPC or the scanning support surface by rotating the LED light bar face way from the OPC and into the deflection apparatus under control of the host computer.

2. A printer-scanner apparatus as in claim 1 wherein the light source is a laser source.

3. A printer-scanner apparatus as in claim 1 wherein the light from the common light source follows a light path during scanning operations, and a semi-opaque mirror in the light path deflects a portion of light in the light path into the light-intensity detector.

4. A printer-scanner apparatus as in claim 1 wherein the scanning system includes a scanned document translation apparatus, whereby a document to be scanned may be translated past a scanning position.

5. A method for scanning a document into a computer memory, comprising steps of:

rotating a LED light bar directed to an organic photoconducting cartridge (OPC) in an electrostatic printer away from the OPC to a document support surface supporting a document to be scanned;

directing a portion of the light in the light path during scanning into a light-intensity detector; and converting light-intensity information relative to time into bit-mapped stored image file printing the stored image file by rotating the LED light bar, returning it to the OPC and directing light to strike the OPC writing an electrostatic image according to the stored image file.

* * * * *